US012800844B2

(12) United States Patent
Jian et al.

(10) Patent No.: US 12,800,844 B2
(45) Date of Patent: Nov. 17, 2026

(54) INITIALLY LOOSE MPO OPTICAL FIBER CONNECTOR

(71) Applicant: NINGBO LITAS OPTICAL TECHNOLOGIES CO., LTD., Ningbo (CN)

(72) Inventors: Benjamin Bin Jian, Ningbo (CN); Yanhe Xiao, Ningbo (CN); Zunzhu Liu, Ningbo (CN)

(73) Assignee: NINGBO LITAS OPTICAL TECHNOLOGIES CO., LTD., Ningbo City (CN)

( * ) Notice: Subject to any disclaimer, the term of this patent is extended or adjusted under 35 U.S.C. 154(b) by 0 days.

(21) Appl. No.: 19/120,244

(22) PCT Filed: Nov. 8, 2022

(86) PCT No.: PCT/CN2022/130586
§ 371 (c)(1),
(2) Date: Apr. 11, 2025

(87) PCT Pub. No.: WO2024/077696
PCT Pub. Date: Apr. 18, 2024

(65) Prior Publication Data

US 2026/0110855 A1 Apr. 23, 2026

(30) Foreign Application Priority Data

Oct. 12, 2022 (CN) ......................... 202211250040.2

(51) Int. Cl.
*G02B 6/38* (2006.01)

(52) U.S. Cl.
CPC ......... *G02B 6/3821* (2013.01); *G02B 6/3885* (2013.01); *G02B 6/3893* (2013.01); *G02B 6/3869* (2013.01); *G02B 6/3882* (2013.01)

(58) Field of Classification Search
CPC ... G02B 6/3821; G02B 6/3885; G02B 6/3893
See application file for complete search history.

(56) References Cited

U.S. PATENT DOCUMENTS

2007/0172172 A1 7/2007 Theuerkorn et al.
2019/0317281 A1* 10/2019 Watanabe ............ G02B 6/3825
2023/0128562 A1* 4/2023 Ho ....................... G02B 6/3821 385/78

FOREIGN PATENT DOCUMENTS

CN 102959446 A 3/2013
CN 104220912 A 12/2014
(Continued)

OTHER PUBLICATIONS

EPO Communication pursuant to Article 94(3) EPC in application 22961878.0, dated Nov. 4, 2025. (Year: 2025).*
(Continued)

*Primary Examiner* — Michael Stahl
(74) *Attorney, Agent, or Firm* — IDEA Intellectual Limited; Sam T. Yip

(57) ABSTRACT

An initially loose MPO optical fiber connector, comprising: a ferrule (2) capable of accommodating an optical fiber, an end face of the optical fiber terminating at the front end of the ferrule (2); an inner housing (3) sleeved on the ferrule (2) and capable of limiting the ferrule (2); pin brackets (4), provided at the rear end of the ferrule (2); springs (8) provided at the rear ends of the pin brackets (4); a backpost (10) for engaging with the inner housing (3); and a component for repeatedly controlling the springs (8) to extend and retract. The wear of pin holes (19) is reduced, the number of times that the optical fiber connector can be plugged/unplugged is remarkably increased, and the service life of the optical fiber connector is greatly prolonged.

13 Claims, 6 Drawing Sheets

(56) References Cited

FOREIGN PATENT DOCUMENTS

| | | | | |
|---|---|---|---|---|
| CN | 204882947 | U | | 12/2015 |
| CN | 205787235 | U | | 12/2016 |
| CN | 106990485 | A | | 7/2017 |
| CN | 110456462 | A | | 11/2019 |
| CN | 110609361 | A | | 12/2019 |
| CN | 110618498 | A | | 12/2019 |
| CN | 210488042 | U | | 5/2020 |
| CN | 111308614 | A | | 6/2020 |
| CN | 111708123 | A | | 9/2020 |
| CN | 211698286 | U | | 10/2020 |
| CN | 218824799 | U | | 4/2023 |
| CN | 222070887 | U | * | 11/2024 |
| JP | H0886937 | A | | 4/1996 |
| JP | H10160967 | A | | 6/1998 |
| JP | H10160969 | A | | 6/1998 |
| WO | 2016053851 | A1 | | 4/2016 |

OTHER PUBLICATIONS

Office Action of the corresponding European application No. 22961878.0 mailed on Oct. 22, 2025.

International Search Report of the corresponding PCT application No. PCT/CN2022/130586 mailed on Jun. 25, 2023.

* cited by examiner

INITIALLY LOOSE MPO OPTICAL FIBER CONNECTOR

TECHNICAL FIELD

The present application relates to the field of optical fiber connectors, and in particular to an initially loose MPO optical fiber connector.

BACKGROUND

MPO optical fiber connector is a connection device used for repeated mating and unmating between optical fibers. It uses high-precision parts to achieve micron-level precision connection of optical fibers. MPO optical fiber connector is a multi-fiber optical fiber connector.

MPO optical fiber connection usually comprises male and female connectors and an adapter, wherein the connector equipped with a fixed guide pin is called a male connector, and the connector mating to the guide pin is called a female connector. The adapter is sleeved at the joint between the male and female connectors, and is used to fix the male and female connectors. The male and female connectors are aligned by the guide pin.

Referring to FIG. 1, the male and female connectors comprise:

- a ferrule 2, which is a precision component manufactured by a plastic injection molding process and comprises multiple optical fiber holes and two guide pin holes, wherein the optical fibers are fixed in the optical fiber holes, the end face of the multiple optical fiber 14 is located at the front end face of ferrule 2, and the guide pin 1 is placed in the guide pin hole;
- a guide pin bracket 4, which is used to fix two guide pins 1 and is connected to the ferrule 2 through the guide pins 1;
- an inner housing 3, which is sleeved on the outer peripheral surface of the ferrule 2; a backpost 10, which is detachably connected to the inner housing 3, wherein the optical fibers can pass through the backpost 10;
- a spring 8 and the guide pin bracket 4, which are arranged inside the inner housing 3, wherein the guide pin bracket 4 is arranged on the rear side of the ferrule 2 close to the backpost 10, and the guide pin 1 passes through the guide pin hole, and is detachably snap-fitted with the guide pin bracket 4.

The spring 8, the guide pin bracket 4, and the ferrule 2 are fixed inside by the inner housing 3 and the backpost 10. The front of the spring 8 abuts against the guide pin bracket 4, and the back of the spring abuts against the backpost 10.

The spring 8 is sleeved on the outer peripheral surface of the optical fiber; the two ends of the spring 8 respectively abut against the backpost 10 and the guide pin bracket 4, and the spring 8 is in a compressed state.

In addition, the male and female connectors further comprise an outer housing 5, a return spring 6, a crimping ring 11, and a rubber boot 12.

SUMMARY

The structure of the existing MPO is introduced in detail above, but the present application reveals that there are significant problems in the existing MPO optical fiber connector, as shown in FIG. 2. FIG. 2 shows a state diagram of a pair of MPO connectors at the beginning of mating in the prior art. The ferrule 2 and the guide pin hole 19 of the existing MPO are usually made of plastic, while the guide pin 1 is a precision component formed of stainless steel or ceramic material, and there is a chamfer on the guide pin 1. Before the MPO connectors are mated, in general, the central axes of the guide pin hole 19 and the guide pin 1 do not line up, so during the mating, the chamfer of the guide pin 1 needs to force the MT ferrule 2 to move sideways to achieve the precise alignment of the two ferrules 2.

Under the action of spring 8, a force of about 10 N pushes the ferrule 2 forward, and the ferrule 2 is pushed into the inner housing 3 and is limited by the inner housing 3. There is a certain lateral static friction force between the ferrule 2 and the inner housing 3, and the static friction force is directly proportional to the spring force. The spring force of 10 N is a relatively large force, and the resulting static friction is relatively large. The guide pin 1 needs to apply a lateral force exceeding the static friction force to the guide pin hole of the ferrule 2, so that the ferrule 2 can move laterally to a position aligned with the guide pin 1. This large lateral force causes the guide pin hole to wear quickly, thereby leading to connector failure and a short connector life.

In this field, the problem of rapid wear of the guide pin hole has existed since the invention of the MPO optical fiber connector and has existed for decades. It is a global problem in this field.

In view of the above-mentioned problems, an object of the present application is to provide an initially loose MPO optical fiber connector, which can effectively solve the problem of rapid wear of the above-mentioned MPO guide pin hole.

In the optical fiber connector of the present application, the spring exists in two states, namely, a loose state and a compressed state. At the beginning of mating, the spring is in a loose state, the static friction of the ferrule is very small, and the guide pin only needs to exert a very small lateral force to move the ferrule to the appropriate position and the alignment operation of inserting the guide pin into the guide pin hole is finished. After alignment, the spring is adjusted to a compressed state by a spring slider.

We call this kind of MPO optical fiber connector as an "initially loose MPO optical fiber connector."

The particular technical solutions of this application are as follows:

An initially loose MPO optical fiber connector component comprises a ferrule sized to receive an optical fiber, wherein the end face of the optical fiber is terminated at the front end of the ferrule; an inner housing sleeved on the ferrule and limits the ferrule; a guide pin bracket which is configured at the rear end of the ferrule; a spring which is configured at the rear end of the guide pin bracket; a backpost which connects with the inner housing; and a means for repeatedly controlling the expansion and contraction of the spring.

In a particular embodiment, the ǂ means for repeatedly controlling the expansion and contraction of the spring comprises: a moving component which is behind the ferrule and can move along an extending line of the optical fiber, wherein the moving component can compress the spring. In a particular embodiment, the means for repeatedly controlling the expansion and contraction of the spring further comprises a fixing component which controls the motion of the moving component.

In a particular embodiment, the moving component is sleeved on the inner housing, and the spring is configured between the guide pin bracket and the moving component.

In a particular embodiment, the moving component comprises a slider, which is an annular structure and is sleeved on the outer surface of the inner housing; a locking window is configured on the inner surface of the slider, and the fixing component comprises a wedge block.

In a particular embodiment, an extension arm is configured on the inner surface of the slider and extends to the interior of the inner housing close to the optical fiber, a sliding groove is configured on the inner housing for the arm to slide, and the extension arm is connected to the spring.

In a particular embodiment, the spring includes two springs configured on both sides of the optical fiber, two ends of each of the springs are respectively connected to the extension arm and the guide pin bracket, a spring guide rod for limiting the spring is configured on the guide pin bracket; and the spring is sleeved on the spring guide rod.

In a particular embodiment, the wedge block is mounted on an elastic arm which is configured on the inner housing and deforms elastically; the wedge block has an inclined surface on a side close to the slider, and a side of the wedge block away from the slider is a plane substantially perpendicular to the optical fiber. There are two of the elastic arms and two of the wedge blocks.

In a particular embodiment, an outer housing, the outer housing presses down the elastic arm and is sleeved on the inner housing; a return spring is configured inside the outer housing.

In a particular embodiment, the sliding groove passes through the rear end surface of the inner housing in an extending line thereof; the backpost can limit the slider, and the backpost is detachably snap-fitted with the inner housing.

In a particular embodiment, a through slot for delivering the optical fiber into the backpost is configured on the backpost; a backpost sealing block for snap-fitting with the through slot is configured on the backpost.

In a particular embodiment, the optical fiber connector component further comprises a crimping ring, which is configured at the rear end of the backpost, and a rubber boot, which is sleeved on the crimping ring.

The present application also provides an initially loose MPO optical fiber connector, which comprises a first connector component t, a second connector component having a guide pin, and the first connector component and/or the second connector component are the above-mentioned connector component.

In a particular embodiment, a guide pin hole is configured on the ferrule of the second connector component, and the guide pin passes through the guide pin hole.

In a particular embodiment, the optical fiber connector further comprises an adapter for fixing the first connector component and the second connector component.

Beneficial Effects

1. The initially loose MPO optical fiber connector of the present application reduces the force of the guide pin on the guide pin hole when the guide pin of the male connector is inserted into the guide pin hole of the female connector, thereby achieving the purpose of reducing the wear of the guide pin hole, significantly increasing the number of times the optical fiber connector can be plugged and unplugged, and greatly improving the service life of the optical fiber connector. After sufficient testing by the applicant, the optical fiber connector can still be used normally after withstanding thousands of plugging and unplugging.

2. The initially loose MPO optical fiber connector of the present application uses a discrete double spring instead of a traditional single spring. For all parts, try to sleeve them on the optical fiber at last. This allows for flexibility in product manufacturing processes and usage. For example, in processes such as ferrule-grinding, there is no constraint from parts such as springs, and the production process will be more convenient.

EXPLANATION OF SYMBOLS

1. Guide pin; 2. Ferrule; 3. Inner housing; 4. Guide pin bracket; 5. Outer housing; 6. Return spring; 7. Spring guide rod; 8. Spring; 9. Slider; 10. Backpost; 11. Crimping ring; 12. Rubber boot; 14. Multi-fiber optical fiber; 15. Locking window; 16. Wedge block; 18. Elastic arm; 19. Guide pin hole; 20. Backpost sealing block; 21. Decoupling part; 22. Extension arm; 23. Sliding groove; 24. Groove; 25. Inclined surface; 26. Rear end face of wedge block; 27. Front end face of wedge block; 28. Reverse buckle; 29. Crimping part; 30. Through slot.

DETAILED DESCRIPTION

The application is described in detail below. Although particular examples of the present application are shown, it should be understood that the present application can be implemented in various forms and should not be limited to the examples set forth herein. On the contrary, these examples are provided to enable a more thorough understanding of the present application and to fully convey the scope of the present application to those skilled in this field.

It should be noted that certain terms are used in the specification and claims to refer to specific assemblies. Those skilled in this field should understand that they may use different terms to refer to the same assembly. This specification and claims do not use differences in nouns as a way to distinguish assemblies but use differences in functions of assemblies as the criterion for distinction. As mentioned throughout the specification and claims, "comprise/comprising" or "include/including" are open-ended terms and should be interpreted as "including but not limited to". The following description is a preferred embodiment of the present application; however, the description is for the purpose of the general principles of the specification and is not intended to limit the scope of the present application. The protection scope of this application shall be determined by the appended claims.

Figure 3:
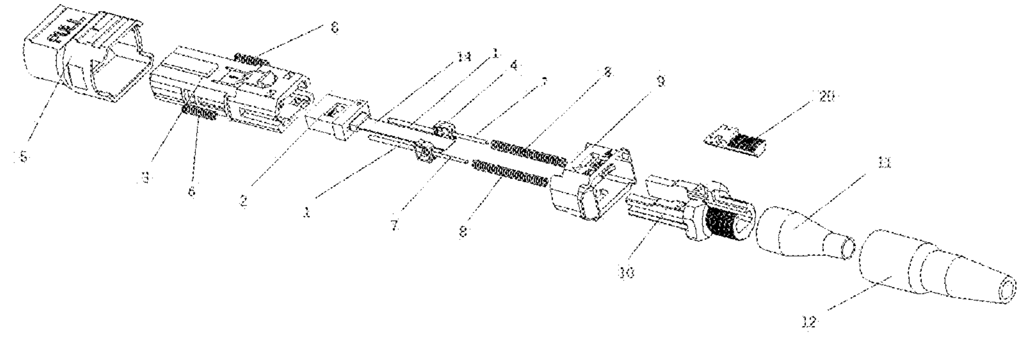
FIG. 3 is an exploded view of the overall structure of the connector component of the present application.

An exploded view of the overall structure of the multi-fiber connector component of the present application may be seen in FIG. 3, which is an exploded view of the overall structure of the multi-fiber connector component of the present application.

As shown in FIG. 3, the present application provides an initially loose MPO optical fiber connector component, which comprises a guide pin 1, a ferrule 2, an inner housing 3, a guide pin bracket 4, an outer housing 5, a return spring 6, a spring guide rod 7, a spring 8, a slider 9, a backpost 10, a crimping ring 11, a rubber boot 12, and a backpost sealing block 20.

The ferrule 2 is capable of accommodating an optical fiber (for example, a multi-fiber optical fiber 14), and the end face of the optical fiber terminates at the front end of the ferrule 2. The inner housing 3 is sleeved on the ferrule 2 and can limit the ferrule 2. The guide pin bracket 4 is provided at the rear end of the ferrule 2. The spring 8 is provided at the rear end of the guide pin bracket 4. The backpost 10 is used for engaging with the inner housing 3. The initially loose MPO optical fiber connector component further comprises a component for repeatedly controlling the expansion and contraction of the spring 8.

The component for repeatedly controlling the expansion and contraction of the spring 8 according to the present application comprises a moving component is behind the ferrule 2 and capable of moving along the extending direction of the optical fiber harness and a fixing component capable of controlling the motion of the moving component.

In a particular embodiment, the inner housing 3 and the backpost 10 are both hollow structures. After assembly, the ferrule 2 and the optical fibers are both arranged inside the inner housing 3 and the backpost 10.

The several optical fibers are connected by the multi-fiber connector of the present application, and the multiple optical fibers are also referred to as optical fiber harness or multi-fiber optical fiber 14 in the present application.

During the connection process of the optical fibers, the optical fiber harness forms an optical fiber end face at the joint. In the field of optical fiber, one end close to the optical fiber end face is usually defined as the front end, and the other end, which is away from the optical fiber end face along the extending direction of the optical fiber, is defined as the back end.

The present application also provides an initially loose MPO optical fiber connector, which comprises a first connector component, a second connector assembly unit having a guide pin, and an adapter for fixing; wherein the first connector component and/or the second connector assembly unit is the above-mentioned initially loose MPO connector assembly unit.

Figure 8:
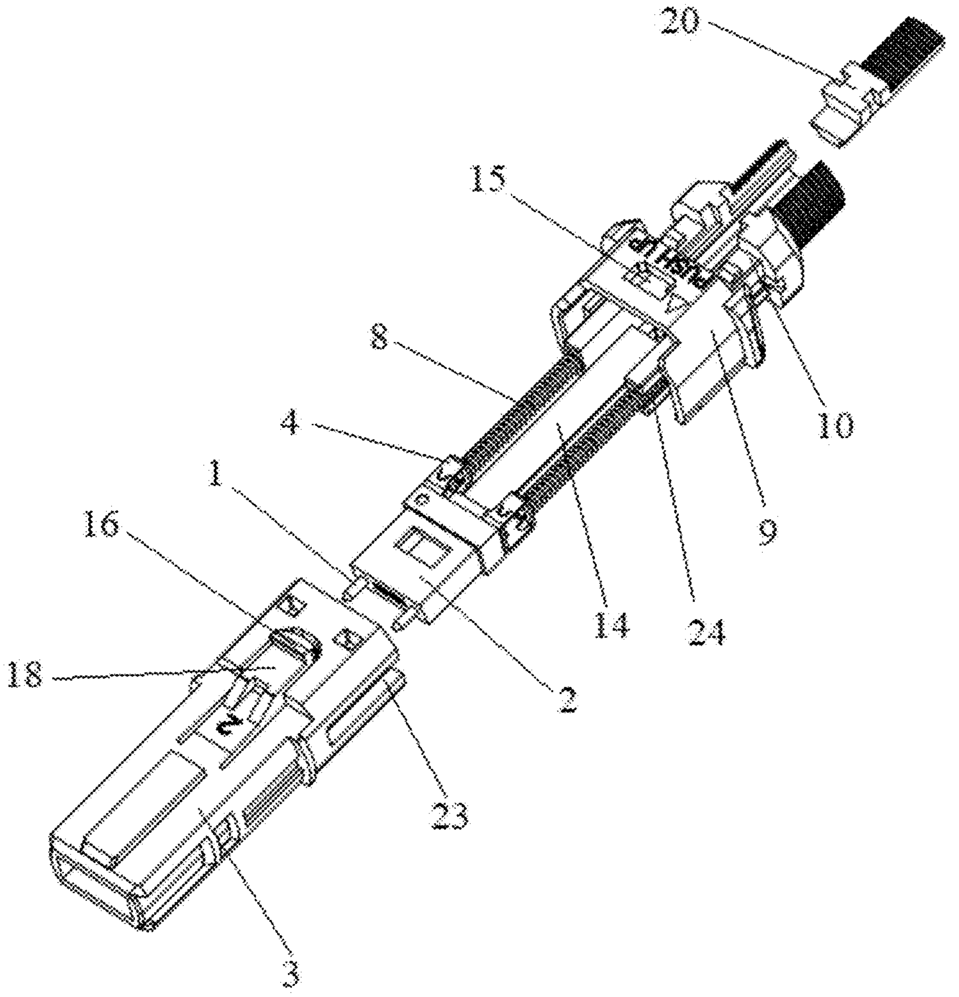
FIG. 8 is an exploded view of the preliminary installation structure of the connector component in the present application (a schematic diagram of the installation sequence of a connector component).

Referring to FIGS. 3 and 8, after installation, the ferrule 2 is located inside the inner housing 3, and there is a gap between the ferrule 2 and the inner housing 3, so that the ferrule 2 can move inside the inner housing 3. When the optical fiber harnesses are connected, the two ferrules 2 need to be aligned; at this time, due to the existence of errors, the ferrules 2 need to be adjusted to a suitable position in the inner housing 3.

As described in detail in the background art (FIG. 2), in the existing MPO connector, the spring 8 continuously provides elastic force to the ferrule 2, so that the ferrule 2 tightly abuts against the inside of the inner housing 3, making it very difficult to adjust the position of the ferrule 2 in the inner housing 3.

However, as described in detail below, the component of the present application can repeatedly control the expansion and contraction of the spring 8. When the optical fiber harnesses need to be connected, the spring 8 is extended to reduce the elastic force applied by the spring 8 to the ferrule 2, so that the ferrule 2 can be more easily moved inside the inner housing 3 to find a suitable position for mating, thereby reducing the resistance encountered by the ferrule 2 when adjusting its position, reducing the wear of the guide pin hole caused by resistance or friction, and increasing the service life of the optical fiber connector and optical fiber connector components.

When the ferrule 2 is adjusted to a suitable position and the optical fiber harness is docked, the position of the ferrule 2 inside the inner housing 3 has been determined. The component of the present application can control the spring 8 to compress, and the spring 8 adds sufficient pre-tightening force to the ferrule 2, so that the ferrule 2 is tightly against the inside of the inner housing 3, thereby reducing the motion of the ferrule 2 inside the inner housing 3, and increasing the mating force of the optical fiber connector.

Figure 4:
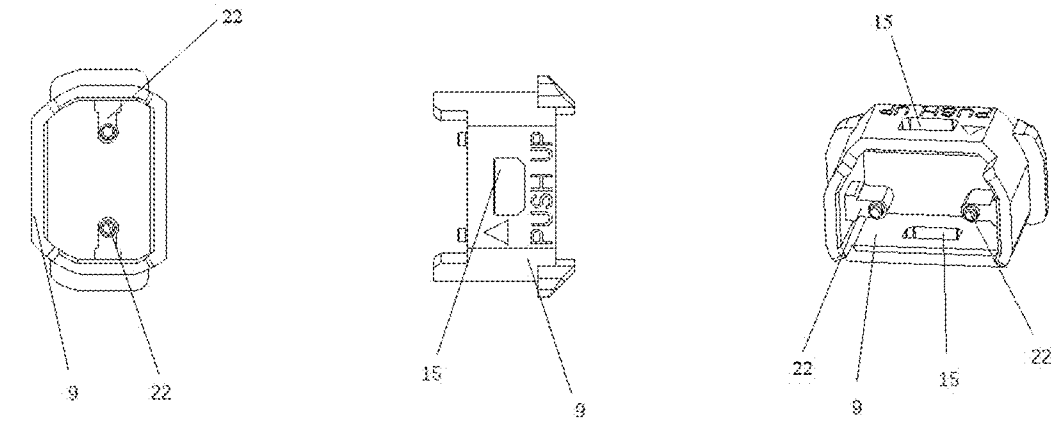
FIG. 4 is a three-view diagram of the slider in the present application.

FIG. 4 is a three-view diagram of the slider 9 in the present application. The slider 9 is an annular structure with two inwardly extending extension arms 22 and two locking windows 15. A protrusion structure for snap-fitting with the spring 8 is provided on the extension arm 22. The hollow portion of the annular structure allows the ferrule 2 to pass through.

Figure 5:
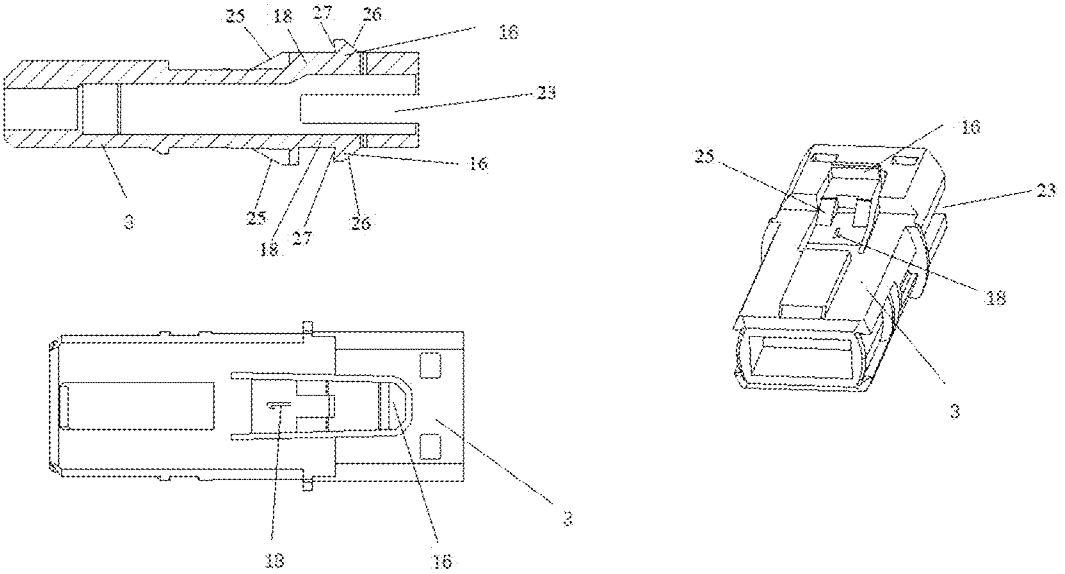
FIG. 5 is a three-view diagram of the inner housing in the present application.

FIG. 5 is a three-view diagram of the inner housing 3 in the present application. The inner housing 3 is a hollow structure, and at upper and lower parts, it comprises two elastic arms 18, two sliding grooves 23 and two wedge blocks 16. Each of the two wedge blocks 16 has a front end face 27 and a rear end face 26. The front end face 27 is a plane substantially perpendicular to the multi-fiber optical fiber 14, and the rear end face 26 is an inclined surface. An inclined surface 25 is provided on each of elastic arms 18.

Figure 6:
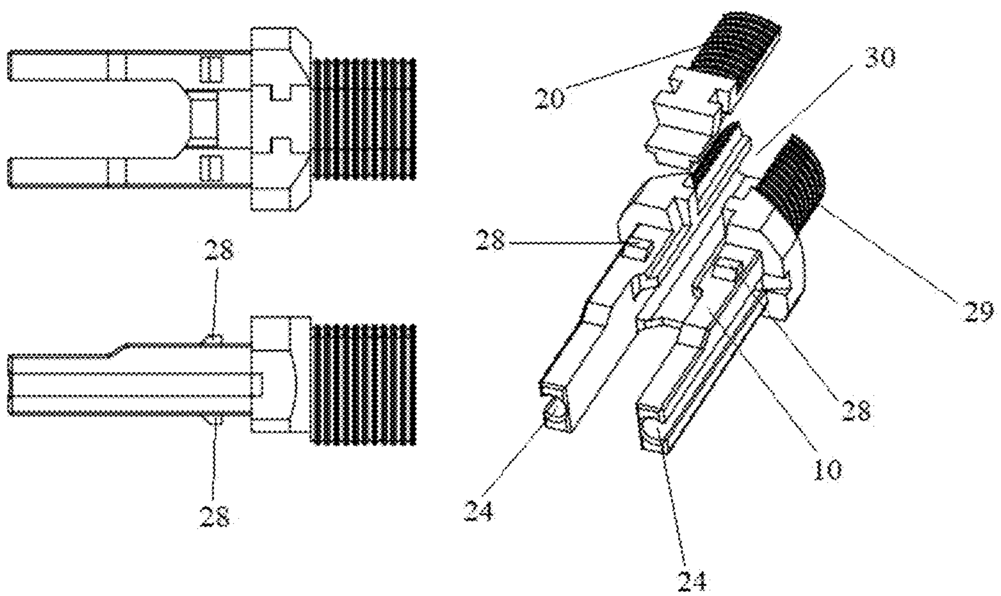
FIG. 6 is a three-view diagram of the backpost and the backpost sealing block in the present application.

FIG. 6 is a three-view diagram of the backpost 10 and the backpost sealing block 20 in the present application. It comprises two grooves 24, four reverse buckles 28, and a backpost crimping part 29. The backpost is provided with a through slot 30 which cooperates with the backpost sealing block 20. The optical fiber harness can pass through the through slot 30 and enter the central axis portion of the backpost. After entering, the backpost sealing block 20 can be snap-fitted with the backpost through slot 30 to form a closed structure.

Figure 7:
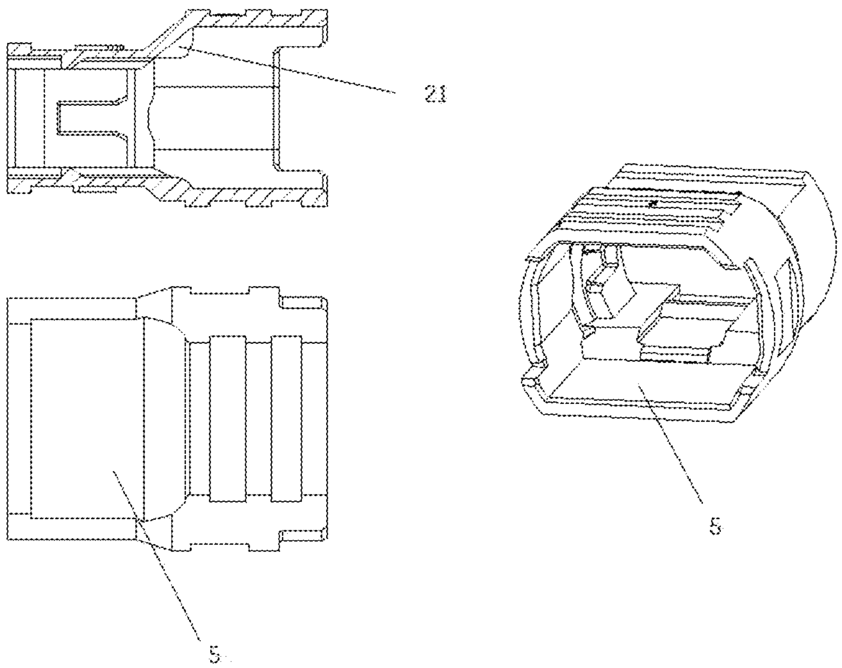
FIG. 7 is a three-view diagram of the outer housing in the present application.

FIG. 7 is a three-view diagram of the outer housing 5 in the present application. The outer housing 5 is a hollow structure, which is sleeved on the inner housing 10 and comprises a decoupling part 21. It serves a dual function.

1) The outer housing 5 cooperates with the inner housing 3 and the return spring 6 to achieve locking between the MPO multi-fiber connector and the MPO adapter. This is the same as the function of the outer housing of a common MPO optical fiber connector.
2) The decoupling part 21 of the outer housing 5 controls the slide block 9 through the inner housing 3, so that the slide block 9 slides from the front position to the rear position. The specific movement mechanism is shown in FIG. 11.

FIG. 8 is an exploded view of the preliminary installation structure of the component in the present application, showing the installation sequence of the connector component. After the ferrule 2, the guide pin bracket 4 and the double springs 8 are assembled, the rear ends of the two springs 8 are snap-fitted with the protrusion structure of the slider 9. The extension arm 22 of the slider 9 firstly passes through the sliding groove 23 of the inner housing 3 and extends into the groove 24 of the backpost 10, and can slide along the groove 24.

Figure 9:
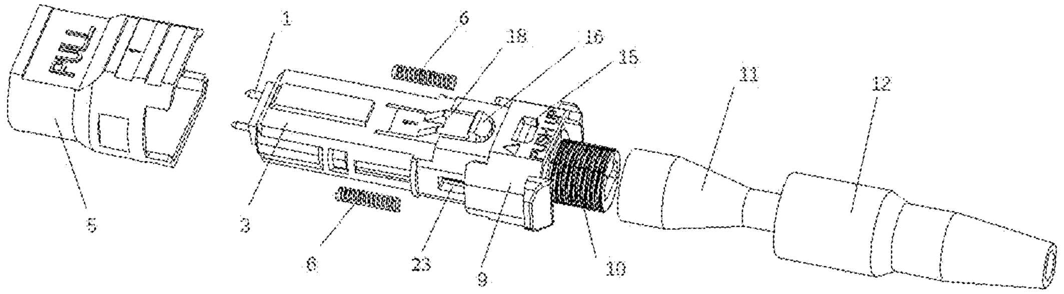
FIG. 9 is an exploded view of a further installation structure of a connector component in the present application.

FIG. 9 is an exploded view of a further installation structure of the connector component in the present application. Herein, the backpost 10 and the inner housing 3 are snap-fitted to form the main body of the optical fiber connector of the present application. The extension arm 22 of the slider 9 can slide along the sliding groove 23 of the inner housing 3.

In FIG. 9, there further is the following unassembled parts: a crimping ring 11, which is disposed at the rear end of the backpost 10 and butted against the crimping part 29 of the backpost; a rubber boot 12, which is sleeved on the crimping ring 11; a return spring 6; and an outer housing 5.

Figure 10A:
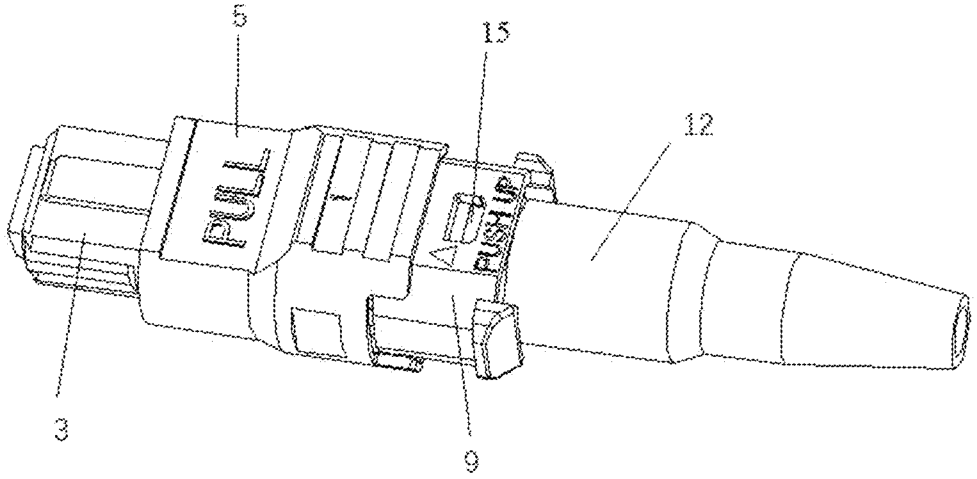
FIGS. 10(A) and 10(B) are diagrams of the connector component in the spring-relaxed state and spring-compressed state after installation in the present application.
Figure 10B:
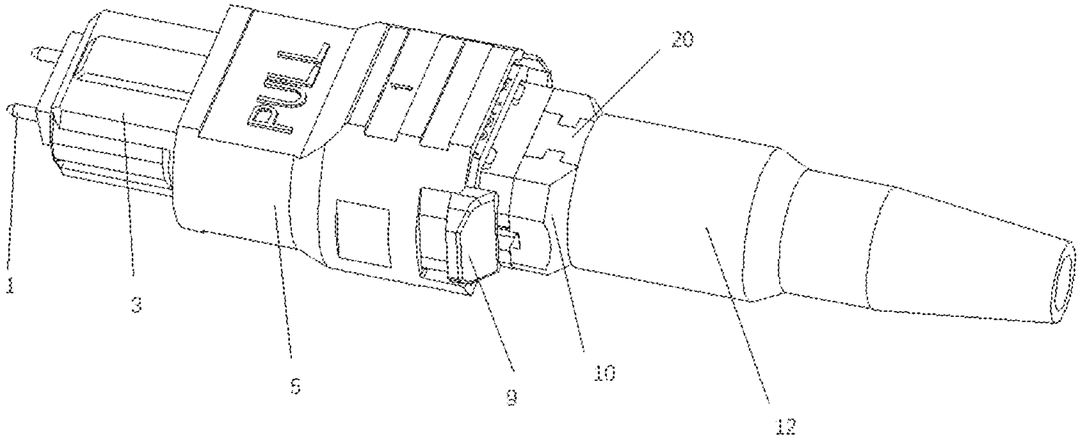

FIG. 10(A) and FIG. 10(B) are diagrams of the connector component in the spring-relaxed state and spring-compressed state after installation in the present application. The crimping ring 11, the rubber boot 12, the return spring 6, and the outer housing 5 have all been assembled in place.

The connector component in the spring-relaxed state in the present application is shown in FIG. 10(A), at this time the slider 9 is in the rear position and the spring 8 is in the relaxed state.

The connector component in the spring-relaxed state in the present application is shown in FIG. 10(B), in which the slider 9 is in the front position and the spring 8 is compressed by the slider 9, at this time the spring 8 is in a compressed state.

From the relaxed state of a spring to the compressed state the spring: the slider 9 is pushed forward until the slider 9 is locked at the front position for the slider.

From the compressed state of a spring to the relaxed state of the spring: the outer housing 5 is pulled backward until the slider 9 is released and retreats to the rear position for the slider.

The normal operation steps of the connector component in this application are as follows.

Inserting into the MPO Adapter 1) making sure the connector is in a spring-relaxed state;
2) holding the backpost, and inserting the connector into the MPO adapter;
3) pushing the slider 9 forward until it is locked to the front position for the slider and the spring enters a compressed state.

Unplugging from the MPO Adapter

The outer housing 5 only needs to be pulled backwards.

Such a simple pull-back operation actually involves the following two actions:

1) the outer housing 5 is pulled, until the slider 9 is released and retreats to the rear position for the slider;
2) the continued movement of the outer housing 5 then allows the release of the lock between the connector and the MPO adapter, and the connector is pulled out of the MPO adapter.

Figure 11A:
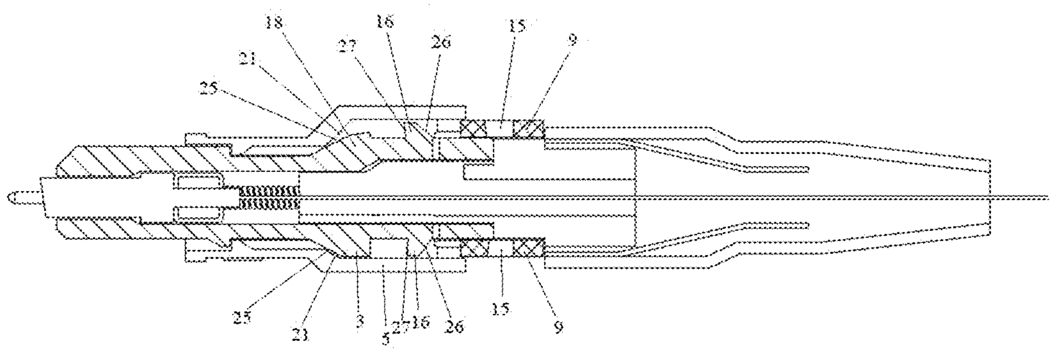
FIGS. 11(A) and 11(B) are cross-sectional views of the of the connector component in the spring-relaxed state and spring-compressed state after installation in the present application.

FIG. 11(A) is a cross-sectional view of the connector component in the spring-relaxed state after installation in the present application, wherein the slider 9 is in the rear position, the spring 8 is in a relaxed state, and the locking window 15 is not snap-fitted with the wedge block 16.

Figure 11B:
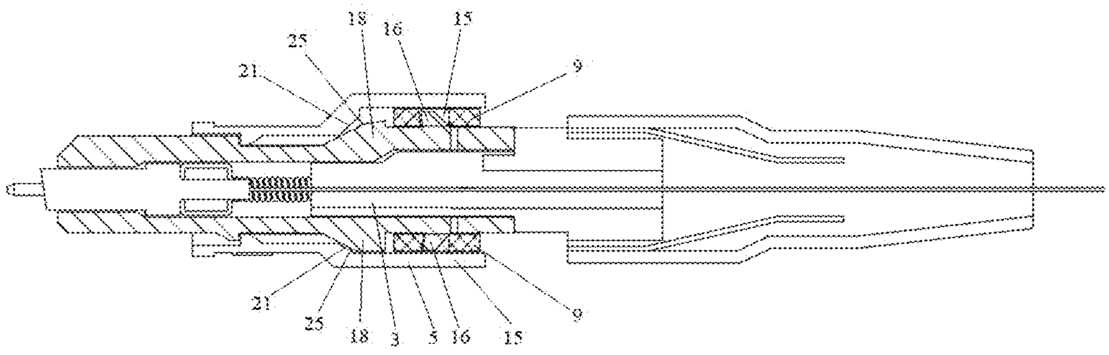

FIG. 11(B) is a cross-sectional view of the connector component in the spring-compressed state after installation. The slide block 9 is in the front position, the spring 8 is compressed by the slide block 9, and the spring 8 is in a compressed state. At this time, the locking window 15 is snap-fitted with the wedge block 16.

When the slider 9 slides from the rear position for the slider in FIG. 11(A) to the front position, since the rear end face 26 of the wedge block 16 is an inclined surface, the slider 9 will press the wedge block 16 toward the center of the inner housing 3. Since the elastic arm 18 has elastic deformation ability, the wedge block 16 will be pressed down into the inner housing 3, and the slider 9 will continue to slide forward on the inner housing 3. When the slider 9 slides until the wedge block 16 is aligned with the locking window 15, the elastic arm will rebound elastically in the opposite direction, the wedge block 16 enters inside the locking window 15, and the front end surface 27 of the wedge block 16 is snap-fitted inside the locking window 15, so that the wedge block 16 and the slider 9 are fixed. This position of the slide block 9 is the front position, and the spring 8 is compressed.

At this time, the spring 8 exerts a backward elastic force on the slider 9, so the slider 9 has a tendency to move backward. Since the front end face 27 of the wedge block 16 is a substantially vertical plane, the front end face 27 of the wedge block 16 abuts against the inner wall of the front surface of the locking window on the slider 9, thereby achieving the limiting effect on the slider 9 by the wedge block 16.

To return from the spring-compressed state (FIG. 11(B)) to the spring-relaxed state (FIG. 11(A)), the outer housing 5 needs to be slid backward, and the two decoupling parts 21 on the outer housing 5 push the two inclined surfaces 25 on the two elastic arms 18 of the inner housing 3; then the elastic arms 18 undergo elastic deformation, pressing the elastic arms 18 downward toward the inside of the inner housing 3, and the wedge block 16 moves toward the central axis of the inner housing 3. The wedge block 16 enters inside the inner housing 3, so that the wedge block 16 is disengaged from the locking window 15, releasing the limiting effect on the slider 9. At this time, the slider 9 moves toward the rear end and reaches the end of the motion range, and the spring 8 returns to a relaxed state.

Design Features

1) The initially loose MPO optical fiber connector according to the present application solves the problem of rapid wear of the guide pin hole in the traditional MPO optical fiber connector, and is an enhanced version of the MPO optical fiber connector.

2) As an MPO optical fiber connector, the initially loose MPO optical fiber connector according to the present application uses a standard MPO adapter.

3) Efficient design:

The initially loose MPO optical fiber connector according to the present application proposes a working principle of spring pre-relaxation to solve the problem of rapid wear of the guide pin hole of the MT ferrule. The elastic force of the spring can be controlled. When the MPO adapter is inserted, the spring of the MPO connector has almost no elastic force, so that the wear of the MT guide pin hole caused by the guide pin is minimized.

The MPO connector, which has a component for controlling the elastic force of the spring, needs to be designed as an assembly that is as small as possible. The action of controlling the elastic force of the spring should preferably be completed instantly for ease of use. These requirements are satisfactorily achieved through the annular slider 9 and the elastic arm 18 on the inner housing 3. The MPO connector according to the present application is only slightly larger in size and length than the traditional MPO connector.

4) Assembly flexibility:

The design of the initially loose MPO optical fiber connector according to the present application optimizes the convenience of assembly as much as possible. The various parts required are avoided from being pre-sleeved on the optical fiber harness as far as possible, but can be "flying" into the connector during assembly.

i) Discrete double springs are used instead of the conventional single spring.

ii) The annular design of the slider 9 allows the MT ferrule and the optical fiber harness to pass through directly.

iii) The through slot 30 of the backpost 10 and the backpost sealing block 20 allow the optical fiber harness to "fly" into the center of the backpost.

This brings flexibility to the product, and makes it easier to produce. There is no influence of parts such as a spring during processes such as ferrule grinding, making the production process more convenient.

EXAMPLES

The initially loose MPO optical fiber connector component of the present application as shown in FIG. 10(A) and FIG. 10(B) have been prepared, and the use effect has been verified.

1) In order to verify the effect of the initially loose MPO optical fiber connector according to the present application on extending the service life, the MT ferrule is made into a non-contact MT ferrule (the end face of optical fiber is polished to recess, and the end face of optical fiber is coated with an anti-reflection film), and then assembled into the MPO optical fiber connector component according to the present application to make an MPO optical fiber connector jumper cable.

We tested the insertion loss of 10 pairs of MPO optical fiber connector jumper cables made in this way. It was found that after 1500 times of plugging and unplugging, the insertion loss was less than the pre-set 0.5 dB standard.

Figure 1:
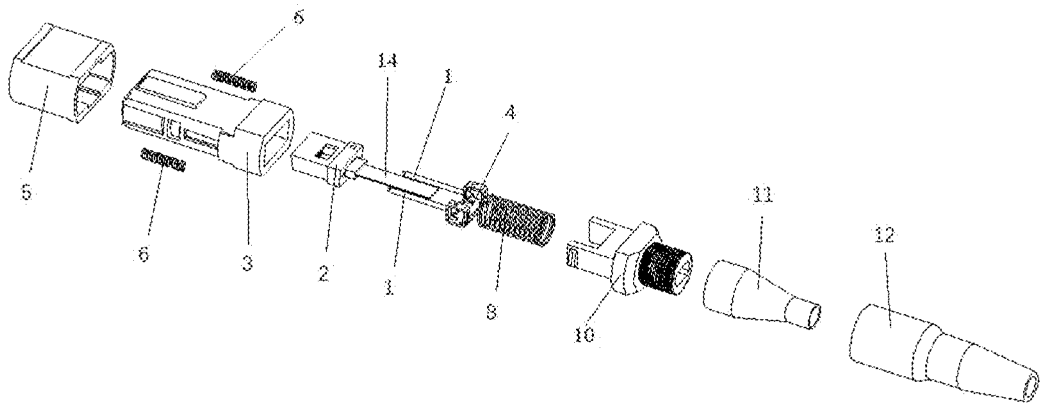
FIG. 1 is an exploded view of the structure of an MPO connector in the prior art.
Figure 2:
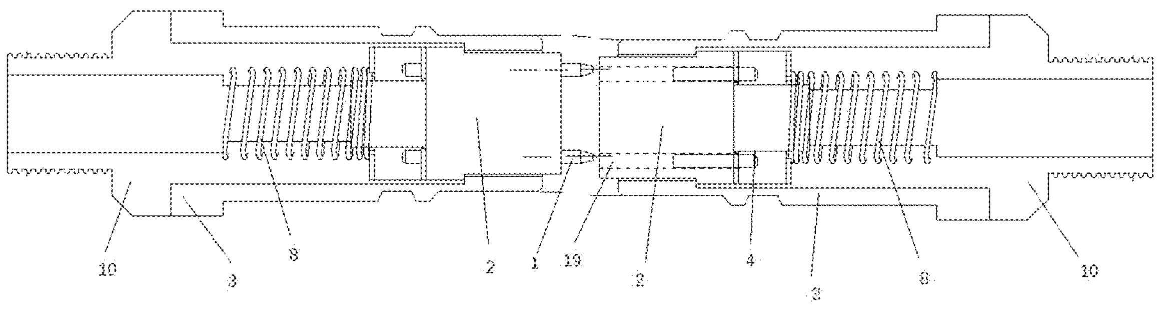
FIG. 2 shows a state diagram of a pair of MPO connectors at the beginning of mating in the prior art.

In contrast, the plugging and unplugging life of non-contact MPO optical fiber connector jumper cables using standard MPO optical fiber connector component (as shown in FIGS. 1 and 2) and the same non-contact MT ferrules varies in a range of 100-800 times.

This demonstrates that the initially loose MPO optical fiber connector according to the present application significantly improves the life of the MPO optical fiber connector.

2) In order to verify the improvement of the initially loose MPO optical fiber connector according to the present application over the standard MPO optical fiber connector, we used a contact MT ferrule, and assembled it into the initially loose MPO optical fiber connector according to the present application, then tested the insertion loss of the MPO optical fiber connector jumper cable, and compared it with the standard MPO optical fiber connector.

The results show that, the insertion loss variation of the standard MPO optical fiber connector is 2.3 times that of the initially loose MPO optical fiber connector. The improvement of the performance of the MPO optical fiber connector by the initially loose MPO optical fiber connector is equally suitable for both the non-contact MPO optical fiber connector and the contact MPO optical fiber connector.

This particular example is merely an explanation of the present application, and is not a limitation of the present application. After reading this specification, those skilled in this field may make modifications to the present example without any creative contribution as needed, and such modifications fall in the protect scope of the claims of the present application according to the patent law.

The invention claimed is:

1. An initially loose MPO optical fiber connector component, comprising:

a ferrule capable of accommodating an optical fiber, wherein an end face of the optical fiber is terminated at a front end of the ferrule;

an inner housing sleeved on the ferrule and capable of limiting the ferrule;

a guide pin bracket configured at a rear end of the ferrule;

a spring configured at a rear end of the guide pin bracket and capable of providing elastic force to the guide pin bracket;

a backpost configured at a rear end of the inner housing for engaging with the inner housing; and a means for repeatedly controlling the expansion and contraction of the spring, comprising a moving component, wherein:

the moving component is configured behind the ferrule;

the moving component can move along an extending line of the optical fiber; and the moving component can compress the spring;

wherein the means for repeatedly controlling the expansion and contraction of the spring further comprises a fixing component capable of controlling the motion of the moving component; and wherein the spring is in a loose state at an initial state of mating and the spring is adjusted to a compressed state by the moving component after alignment.

2. The optical fiber connector component according to claim 1, wherein the moving component is sleeved on the inner housing; and wherein the spring is configured between the guide pin bracket and the moving component.

3. The optical fiber connector component according to claim 1, wherein the moving component comprises a slider which is an annular structure and is sleeved on an outer surface of the inner housing, a locking window is configured on an inner surface of the slider, and the fixing component comprises a first wedge block.

4. The optical fiber connector component according to claim 3, wherein an extension arm is configured on the inner surface of the slider and extends to the interior of the inner housing close to the optical fiber, a sliding groove is configured on the inner housing for the arm to slide, and the extension arm is connected to the spring.

5. The optical fiber connector component according to claim 4, wherein the spring includes two springs configured on both sides of the optical fiber, two ends of each of the springs are respectively connected to the extension arm and the guide pin bracket, a spring guide rod for limiting the spring is configured on the guide pin bracket, and the spring is sleeved on the spring guide rod.

6. The optical fiber connector component according to claim 3, wherein the first wedge block is mounted on a first elastic arm, the first elastic arm is configured on the inner housing and capable of deforming elastically;

wherein the first wedge block has an inclined surface on a side close to the slider, and a side of the first wedge block away from the slider is a plane substantially perpendicular to the optical fiber;

wherein the optical fiber connector component further comprising a second elastic arm and a second wedge block, the second elastic arm and the second wedge block are configured substantially similarly as to the first elastic arm and the first wedge block respectively.

7. The optical fiber connector component according to claim 6, further comprising an outer housing;

wherein the outer housing is capable of pressing down both the first and the second the elastic arms when the outer housing is sleeved on the inner housing; and wherein a return spring is arranged inside the outer housing.

8. The optical fiber connector component according to claim 4, wherein the sliding groove passes through a rear end surface of the inner housing in an extending line thereof;

wherein the backpost is configured to limit the slider, and the backpost is detachably snap-fitted with the inner housing.

9. The optical fiber connector component according to claim 1, wherein a through slot for delivering the optical fiber into the backpost is configured on the backpost; and wherein a backpost sealing block for snap-fitting with the through slot is configured on the backpost.

10. The optical fiber connector component according to claim 1, wherein the optical fiber connector component further comprises:

a crimping ring which is configured at a rear end of the backpost; and a rubber boot which is sleeved on the crimping ring.

11. An initially loose MPO optical fiber connector, comprising:

a first connector component;

a second connector component having a guide pin; and the first connector component and/or the second connector component are the connector component according to claim 1.

12. The optical fiber connector according to claim 11, wherein a guide pin hole is configured on the ferrule of the second connector component, and the guide pin passes through the guide pin hole.

13. The optical fiber connector according to claim 11, wherein the optical fiber connector further comprises an adapter for fixing the first connector component and the second connector component.

* * * * *